(12) United States Patent
Kumar et al.

(10) Patent No.: US 11,157,987 B2
(45) Date of Patent: Oct. 26, 2021

(54) SYSTEM AND METHOD FOR OBTAINING RECOMMENDATIONS USING SCALABLE CROSS-DOMAIN COLLABORATIVE FILTERING

(71) Applicant: PAYPAL, INC., San Jose, CA (US)

(72) Inventors: Dinesh Kumar, Santa Clara, CA (US); Yuanyuan Pan, Fremont, CA (US); Prashant Gaurav, Fremont, CA (US); Fransisco Kurniadi, Dublin, CA (US); Yue Xin, San Jose, CA (US); Krishnakumar Govindarajalu, San Jose, CA (US); Kimberly Kidney, Salem, MA (US); Tao Sun, Union City, CA (US); Kevin Ward, Sacramento, CA (US)

(73) Assignee: PayPal, Inc., San Jose, CA (US)

( * ) Notice: Subject to any disclaimer, the term of this patent is extended or adjusted under 35 U.S.C. 154(b) by 142 days.

(21) Appl. No.: 16/215,808

(22) Filed: Dec. 11, 2018

(65) Prior Publication Data

US 2020/0184537 A1  Jun. 11, 2020

Related U.S. Application Data

(63) Continuation-in-part of application No. 16/213,346, filed on Dec. 7, 2018.

(51) Int. Cl.
*G06Q 30/00* (2012.01)
*G06Q 30/06* (2012.01)
(Continued)

(52) U.S. Cl.
CPC .......... *G06Q 30/0631* (2013.01); *G06N 5/04* (2013.01); *G06N 20/20* (2019.01)

(58) Field of Classification Search
CPC ..... G06Q 30/0601–0645; G06N 20/20; G06N 5/04
(Continued)

(56) References Cited

U.S. PATENT DOCUMENTS 9,619,831 B1 * 4/2017 Kumar ................... G06Q 20/20
2007/0255653 A1 * 11/2007 Tumminaro ....... G06Q 30/0631
(Continued)

OTHER PUBLICATIONS

Demissie, S., & Mogalla, S. (2018). A clustering-based context-aware recommender systems through extraction of latent preferences. International Journal of Advanced Research in Computer Science, 9(2), 699-707. (Year: 2018).*
(Continued)

*Primary Examiner* — Resha Desai
*Assistant Examiner* — Kennedy Gibson-Wynn
(74) *Attorney, Agent, or Firm* — Haynes and Boone, LLP

(57) ABSTRACT

Aspects of the present disclosure involve systems, methods, devices, and the like for presenting a recommendation. In one embodiment, a system is introduced that includes a plurality of models for obtaining a recommendation score. The recommendation score may be obtained using one or more recommendation models and a recommendation made based on the recommendation score determined. In another embodiment, the system is introduced that can re-train the recommendation model based on a feedback received in response to a recommendation made using on the recommendation score obtained.

19 Claims, 10 Drawing Sheets

(51) Int. Cl.
 *G06N 20/20* (2019.01)
 *G06N 5/04* (2006.01)
(58) Field of Classification Search
 USPC .............................................. 705/26.1–27.2
 See application file for complete search history.

(56) References Cited

U.S. PATENT DOCUMENTS

| | | | |
|---|---|---|---|
| 2009/0006290 A1* | 1/2009 | Gunawardana | G06Q 10/04 706/14 |
| 2011/0251868 A1 | 10/2011 | Mikurak | |
| 2013/0097664 A1 | 4/2013 | Herz et al. | |
| 2016/0005070 A1* | 1/2016 | Burr | G06Q 30/0635 705/14.51 |
| 2016/0300144 A1* | 10/2016 | Santhanam | G06Q 30/0631 |
| 2017/0177596 A1 | 6/2017 | Comstock et al. | |
| 2018/0174212 A1* | 6/2018 | Lauka | G06Q 30/0641 |
| 2018/0342004 A1* | 11/2018 | Yom-Tov | G06N 7/08 |
| 2019/0066186 A1* | 2/2019 | Singh | G06Q 30/0631 |
| 2019/0213226 A1* | 7/2019 | Ludwinski | G06Q 30/0255 |
| 2020/0134696 A1* | 4/2020 | Lardeux | G06Q 30/0631 |
| 2020/0160229 A1* | 5/2020 | Atcheson | |

OTHER PUBLICATIONS

Sahebi, Shaghayegh, Brusilovsky, Peter, Bobrokov, Vladimir, "Cross-Domain Recommendation for Large-Scale Data"; Proceedings of RecSysKTL Workshop @ ACM RecSys '17, Aug. 27, 2017, Como, Italy, 7 pages.

* cited by examiner

SYSTEM AND METHOD FOR OBTAINING RECOMMENDATIONS USING SCALABLE CROSS-DOMAIN COLLABORATIVE FILTERING

CROSS REFERENCE TO RELATED APPLICATIONS

This application is a continuation-in-part application of U.S. patent application Ser. No. 16/213,346, filed Dec. 7, 2018 and is incorporated by reference in its entirety.

TECHNICAL FIELD

The present disclosure generally relates to communication devices for generating recommendations, and more specifically, to communication devices that provide user specific recommendations using cross-domain collaborative filtering.

BACKGROUND

In the advent of technology, industry has moved to the use of electronic devices and communications for processing transactions. The transactions can generally begin with a consumer submitting a funding instrument for payment and continues to a vendor for authorization of such transaction. In some instances, a recommendation may be provided to a consumer prior to completing such transaction, based in part on a popular item or trend. For example, at checkout, a user may be provided with a recommendation to donate to a popular cause or charity. However, this type of recommendation, is oftentimes not tailored to a user's interests, likes, purchases, and/or associations. Therefore, in an effort to increase the chance of a user purchase or donation, it would be beneficial to create a system that provides recommendations that are tailored to a user and across domains.

Figure 1:
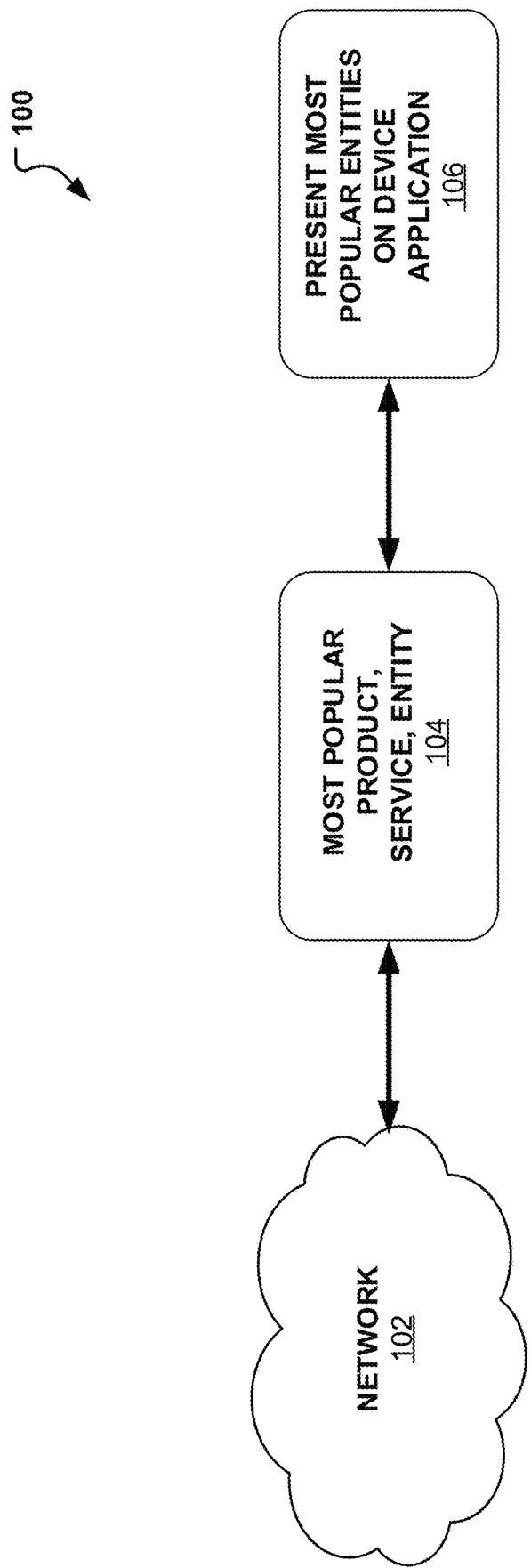
FIG. 1 illustrates systems for presenting a recommendation on a user device.

Embodiments of the present disclosure and their advantages are best understood by referring to the detailed description that follows. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Aspects of the present disclosure involve systems, methods, devices, and the like for presenting a recommendation. In one embodiment, a system is introduced that includes a plurality of models for obtaining a recommendation score. The recommendation score may be obtained using one or more models which can include supervised and unsupervised learning as well as a combination of user information and transactions. In another embodiment, the system is introduced that can provide a total recommendation score and recommendation generated by an ensemble model whose input can include the one or more recommendation scores previously obtained.

Conventionally, to increase customer's engagement, merchants, third-party service providers, and other entities that provide a product or service, may rely on a recommendation of a product or service based on popularity. The engagement is easy to implement, and the product and/or service may be easily presented and considered for purchase. For example, consider FIG. 1 which illustrates a basic system and method for presenting a recommendation to user. As illustrated, a recommendation may derive from a network 102. The network 102 can include any two computers, servers, or other system/device which can be linked together in order to share resources and exchange electronic information. The internet, the cloud, a group of servers, a data center, social media may all be considered part of a network 102. This network may be access and used for determining a most popular item, product, service, or entity to recommend. For example, social media may be scraped, and the data obtained analyzed to determine that a new smart gadget has been released and is trending. Such smart gadget may therefore be presented to a user on a device 106. As another example, a natural disaster may have occurred recently and as a result of the media coverage a popular entity providing relief effort may be presented to the user for donation. Still further, in looking for a charity to contribute to, the YMCA, United Way, Red Cross, etc. may be presented based on knowledge and popularity. These examples, however, fail to neglect a customer's behaviors and/or products, services, entities, etc., which may be smaller or in lower demand.

It is therefore beneficial to have a system which can consider various aspects of a user before making a recommendation. For example, consider a recommendation to a charitable cause. Using the simplified method and system 100 presented in FIG. 1, smaller charities will be neglected, and customer's behaviors omitted. Alternatively, by associating purchase behaviors, user profiles, donation history, transactional history, and the like with donations recommendations may be more customized and relevant to a user.

Note that throughout this application the recommendations and analysis will be generally focused on charities, however, the application is not limited to caused based recommendations and as indicated above, the method and system presented herein may be used for providing recommendations for other products, services, entities and the like.

Figure 2:
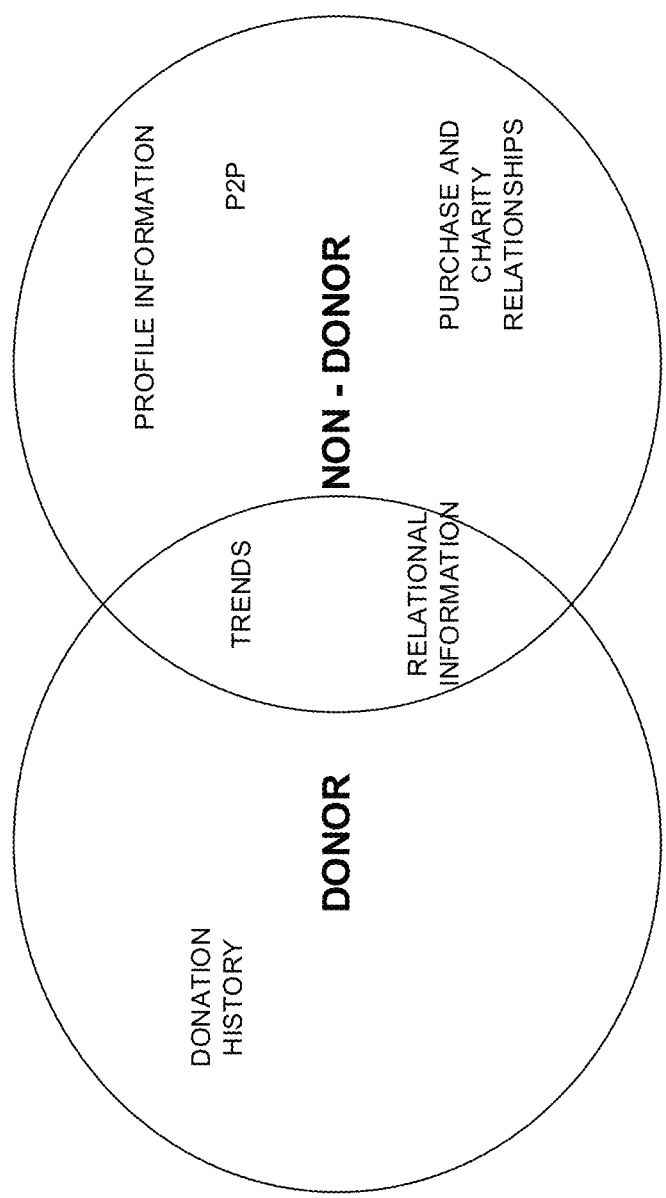
FIG. 2 illustrates an exemplary diagram illustrating the characterization of information for making recommendations.

Turning to FIG. 2, a Venn diagram is provided exemplifying how recommendations may be tailored. In particular, FIG. 2 illustrates an exemplary diagram demonstrating the characterization of information for making recommendations. As indicated, it is beneficial to consider various aspects of a user prior to making a recommendation. In one embodiment, FIG. 2 illustrates an initial aspect that may be considered prior to making a recommendation. For exemplary purposes and to continue with the charitable cause use case, consider Venn diagram 200. In exemplary Venn diagram 200, a first aspect in making a recommendation is considered and can include whether or not a user is or has been a donor. On the left circle 202 of the Venn diagram 200 for example, prior donors to a charitable cause may be considered and characterizing information defined. And alternatively, on the right circle 204 of the Venn diagram 200 users without a donation history may be classified along with characterizing information. Additionally, in some instances characterizing information may be used and shared 206 between prior donors 202 and non-donors 204 for making a recommendation to a charitable cause.

As an example of characterization information which may be used for making a recommendation can include donation history, which could be used and consider for users who have made a previous donation. As another example, characterization information that may be used and considered for a user without donation history, can include user profile information, contacts, merchants, entities, etc. with whom the user may have transacted with, and purchase history and charities associated with the locations where purchases were made. Still as another example, other general characterization information which may be used for making a recommendation may include charitable cause popularity, trends, and other relational information.

Note that although a Venn diagram 200 is used to illustrated characterization information that may be used for making recommendations based on donor/no-donor status, this characterization information is not limited and is used for exemplary purposes. Other characterization information may also be used and the location within the Venn diagram may vary.

Figure 3:
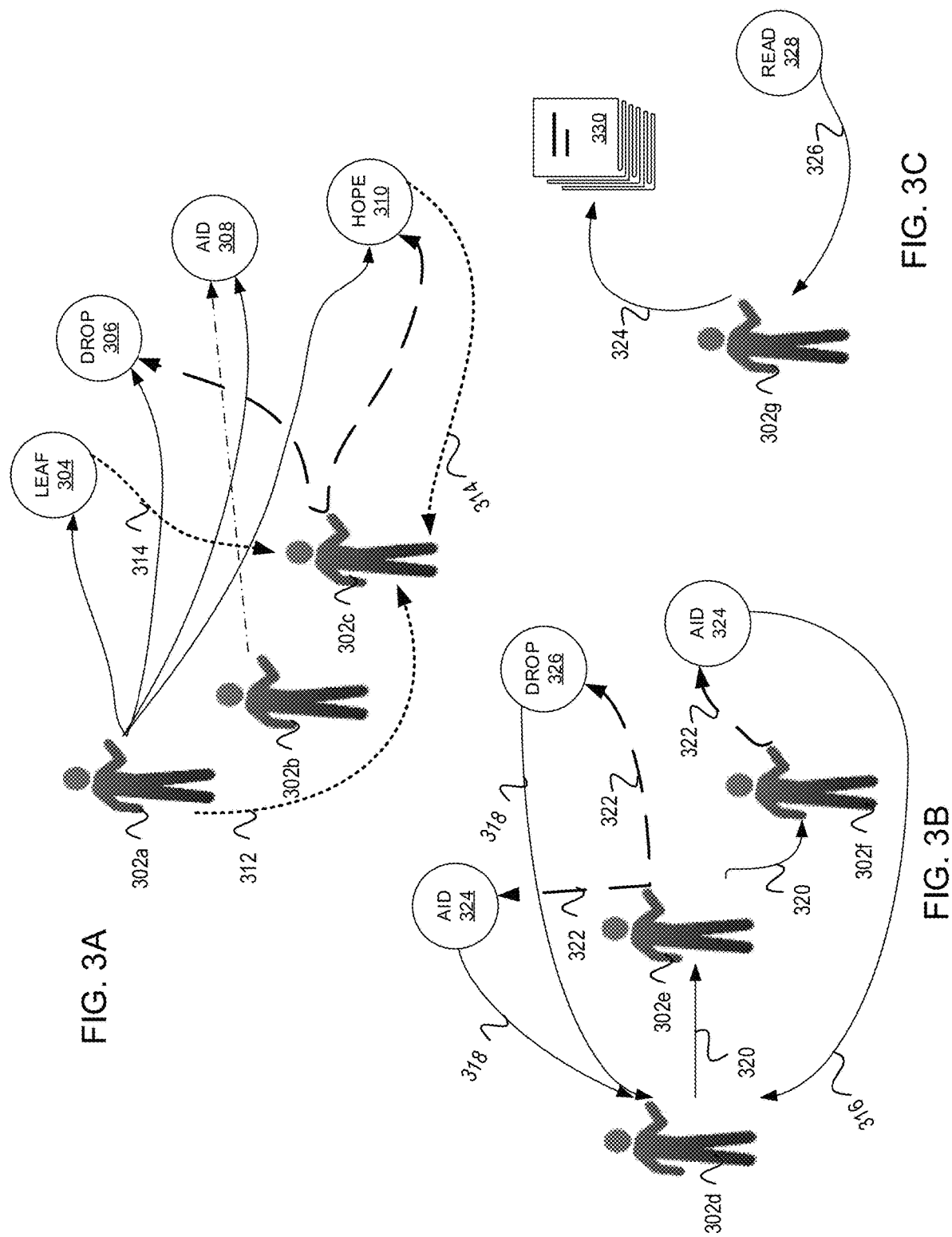
FIGS. 3A-3C illustrate recommendation scenarios based on varying information.

To illustrate how the characterization information may be used to make recommendations, FIGS. 3A-3C are presented. In particular, FIGS. 3A-3C illustrate recommendation scenarios and use cases based on varying characterization information. Turning to FIG. 3A, a first recommendation use case is presented that may use prior donation characterization information for making the charitable cause recommendation. The use case considered in FIG. 3A may use a collaborative filter type approach and use case where a user 302c may be presented with a recommendation based on the donations the user 302c made and/or other users 302a, b made. To illustrate this approach, consider user 302a. This user 302a has a donation history and as illustrated, user 302a has a donation history with donations made to charitable causes 304-310. Turning to user 302b, this user 302b also has a donation history but in this example, donations are focused on a single charitable cause 308. Now using a similar approach, user 302c can be characterized as previously donating with donation history support primary focused on two charitable causes 306, 310. In one embodiment, a charitable cause recommendation may be provided to a user 302c using a collaborative filtering approach. In this scenario, an observation, analysis, or correlation can be made such that a similarity is identified between user 302a and user 302b. This correlation or similarity 312 can be identified based in part on the observation that user 302c, like user 302a, donated to charitable causes 306 and 308. Therefore, based on this assessment and similarity 312, two new recommendations 314 may be made and surfaced to user 302c.

At FIG. 3B, another recommendation scenario and use case is presented based on other varying characterization information. For the use case, transactional information is considered for making a recommendation. In particular, who a user has transacted with and in particular other peers the user has transacted with, (e.g., P2P transaction history). Additionally, characterization information regarding the charitable causes which were donated are also used. In order to provide some insight on the use of P2P transaction history for making a recommendation, FIG. 3B is provided. For this use case, user 302d is illustrated as having transacted 320 with user 302e, while user 302e transacts 320 with user 302f. And moreover, user 302e and user 302f have a donation history, with user 302e donating 322 to charitable causes 324 and 326 while user 302f donates 322 to charitable cause 324. Therefore, the known transaction history and donation characterization information may be used to provide user 302d with a recommendation. In this use case, user 302d is recommended 318 charitable causes 318 and 324 based on the charities the user's 302d contacts are donating to.

Turning to FIG. 3C, yet another recommendation scenario is presented. In this recommendation use case, the purchase history and charitable relationships are considered as the characterization information. For the use case, user 302g may be provided with a recommendation that is surfaced based on the user's purchase history. Thus, charitable cause 328 is presented bases on a purchase 324 of an item 330 by user 302g. To make this recommendation, in one embodiment, metadata attributes associated with the purchase item 330 may be extracted. For example, attributes including the item name, category, description, and the like may be extracted. Then, using the extracted metadata attributes, a charitable cause 328 or other recommendation may be presented to the user 302g.

Note that FIGS. 3A-3C are provided as exemplary use case scenarios used to illustrate how characterization information can be used to provide a recommendation. Note that other use cases are possible as well as the use of more, less, and alternate characterization information. For example, trends, popularity, relational, and other characterization information may be used, and a use case may be presented. Additionally, the number of donations, recommendations, transactions, and similarities identified may vary determining a recommendation.

Figure 4:
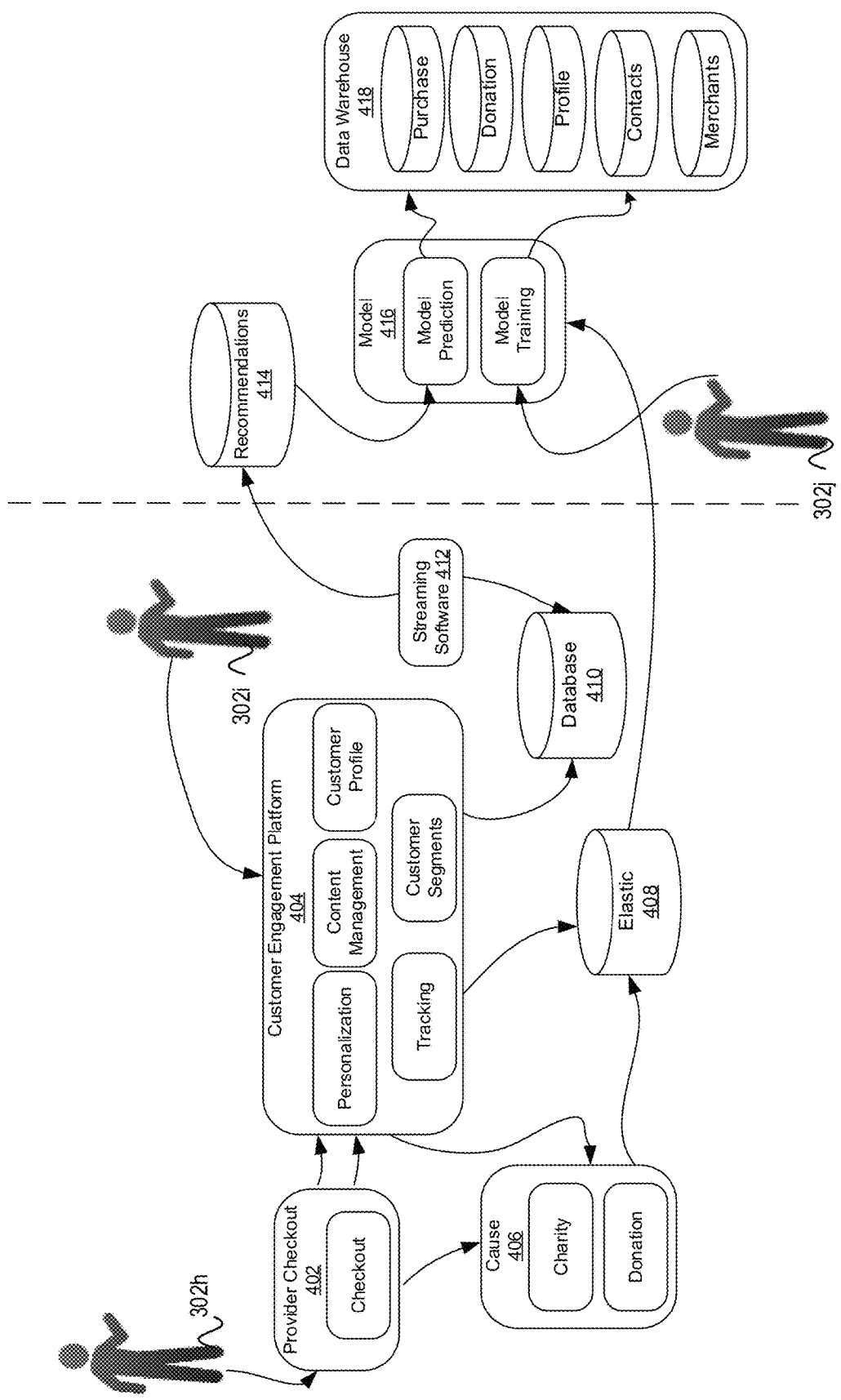
FIG. 4 illustrates an exemplary system used for making and presenting recommendations.

FIG. 4 is next illustrated to provide an exemplary architecture that may be used for implementing a system and platform for making recommendations. Note that to continue with the examples throughout, the architecture 400 at FIG. 4 is defined for charitable cause recommendations as well. However, this platform and system 400 may be used, updated, and implemented for any recommendation.

As illustrated in FIG. 4, in one embodiment, the system may be portioned based on its functions, the left of the dashed line may include modules and interactions mainly applicable to a payment provider application (e.g., PayPal), while the right side may include those modules and interactions considered while performing the analytics. Because a goal in the recommendation system 200 is to surface charitable causes of interest to the user 302, the interaction with the recommendation system 200 will begin with a user 302h interacting with the application at checkout 402. At checkout 402, the user 302h may be preparing to complete a purchase and may be prompted with the opportunity to make a donation to a charitable cause. Checkout 402 at the payment provider may then trigger a communication with a customer engagement platform 404 and a cause module 406. The cause module 406 may be triggered immediately and/or be accessed upon checkout and when the user 302h makes a donation where the donation details may be gathered and stored in an elastic storage component 408 available for making future recommendations and/or receiving charitable details from the customer engagement platform 404. The customer engagement platform 404 can be a processing unit, operating system, and/or a group of technologies from which the other processes and modules may be developed. For example, at the customer engagement platform technologies, modules, or storage units may exist which store, access, or retrieve user characterization information that may be used for making a recommendation. In particular, as exemplified at FIG. 4, the customer engagement platform 404 can include a personalization, content management, customer profile, tracking, and customer segment modules. These modules may be used when extracting customer details during a checkout, for providing characterization information and other relevant details to the cause module 406, for transferring details to a storage/tracking module (e.g., elastic storage component 408, database 410), and/or receive and process entries, updates provided by a secondary user 302i. The secondary user 302i, may be an internal employee of the payment provider with insight on internal strategy and marketing information such that the content input to the customer engagement platform is useful and relevant. Note that the content input may also be dynamically created or automated such that secondary user 302i may be an external system.

Next, the details transferred to the storage and tracking modules 408,410 may be used in the analytics portion of the architecture for making a recommendation. For example, the content tracked at database 410 may then be processed bidirectionally by a streaming software 412 for use by a recommendation component 414. The streaming software 412 (e.g., Kafka) may be used to enable batch content to be read continuously as streams. Generally, such capability is not available as an out of the box feature, which can switch between batch and stream intelligently based on the processing capability in the application and the incoming rate of data. However, the customer engagement module 404/database 410 and the recommendation component 414 may be equipped with an intelligent mode that can seamlessly switch between batch and stream by processing the data through the streaming software 412 like Kafka.

The data at the recommendation component 414 can then be used by a cause model 416 for making predictions. Predictions may be made and the model trained by accessing the details of the user 302i which may be housed in a data warehouse 418. The data warehouse can include various repositories with details about the user 302i including but not limited to purchases made by the user, donations, profile information, contact and friends, as well as merchants with whom the user 302i may transact with.

For training the cause model 416, a combination of the data tracked by the elastic tracking module 408 and manual intervention by another user 302j may occur. The another user 302j may be a data scientist who can determine the information relevant for input to the recommendation model 416. Additionally, or alternatively, a system or other component may be used without the need for manual intervention by the another user 302j. The data tracked by the elastic tracking module 408 used to input to the cause model 416 may include data obtained using feedback. In one embodiment, feedback may be used to train the cause model 416 in order to provide continuous tuning of the cause model 416.

In particular, feedback may be used and collected based on user actions based on the suggested charitable causes presented at checkout. For example, feedback useful and tracked can include whether the users donated to the suggested charities if the charities are the ones they support, or they are willing to support. Other feedback that may be tracked may include whether the users 302 like the suggest charities since generally if a user 302 does not like the charity, they are probably not going to donate to them. Hence, the recommendation architecture 400, provides a system that can continuously track the suggested charities that are being donated (conversion) to, how often the charity may be presented to a user 302j to measure a shown count (impression) from all the products as feedback, and then tune the cause model 416 to provide a better recommendation result.

Therefore, by conversion and impression data may be provided and used to create a suggest charity score value. In one embodiment, a charity score value may be computed by first giving each suggested charity from the cause model 416 with a feedback influence weight (w) value 1. Then, after some observation if the suggested charity surfaced to users 302 does not gain any conversion after a defined time period then, the weight (w) value may be reduced. Ultimately, the weight value can be decreased close to 0 when there is no conversion for N impression times. In such case the probability of recommending a suggested charity to a user 302 lessens. On the other hand, if the suggested charity gains conversion, the weight value (w) may be reset back to 1 to maximize the suggest charity score value, so that next time this charity will be highly promoted to the user 302. Thus, continuous collection of the conversion and impressions by a user 302 based on interactions with a charitable cause may be tracked to construct the recommendation, creating a feedback loop tuned to provide an updated recommendation score/suggested charity score value and produce a more accurate result.

Note, the cause model 416 may include one or more models and machine learning algorithms designed to make recommendations. Machine learning algorithms can include those based off supervised and unsupervised learning and can include models such as but not limited to clustering, tree-based, ensemble, random walk, etc.

Additionally, the recommendation score may be achieved across multiple models. Each model may be personalized to provide a recommended list of charitable causes with a recommendation score provided for each charitable cause. The higher the score, the increase better chance of a correct charitable cause prediction. However, if multiple models are each predicting a list of charitable causes, there is a need to predict the most adequate charitable cause across the various personalization models. Various techniques exist which can be used to enable this. A first technique can include the making a prediction based on the information available. The use of this technique may be appropriate when not all the desired data is available to compute the desired charitable cause for all users at all time. For example, in some instances, user donation history may be missing. In other instances, purchase history may not be available or may be limited. In such instances, from the personalization models available, those with inadequate details may be eliminated or not considered when predicting the list of charitable causes.

Another technique can include the use and prediction made using a calibration of scoring across models. This technique is adequate where multiple factors exist and are considered when arriving at a recommendation score for a given model. The factors may vary from model to model, as such, these factors may be calibrated across each of the other models in order to achieve a recommendation score that is consistent across the models. Note that the use of such technique may include the use of ranking where the charitable causes are ranked and presented to the user 302 in a ranked order.

Still another technique can include the use of a round robin method in order to identify the model with the most affinity to the user 302. This technique may be useful where, for example some users prefer to use charitable causes to which their friends have donated over other methods. This can be identified by rotating the charities in a round-robin fashion across different model out put in a way that can identify the affinity of users to a particular model.

Two other techniques can include the scoring of charitable causes recommended by multiple models and the use of a champion technique. The technique that uses scoring is useful in instances where the various charitable causes are recommended by multiple models. In this instance, the various charitable causes may obtain a secondary recommendation score based on the probability of selection by the user. The champion technique entails the user of multiple models simultaneously. Here, the best performing model may be selected as the champion and is selected to produce the recommendation for the user. Other models can still challenge the champion with simulation data. Once another model out performs the existing champion, then that other model is used for presenting the recommendation.

Figure 5:
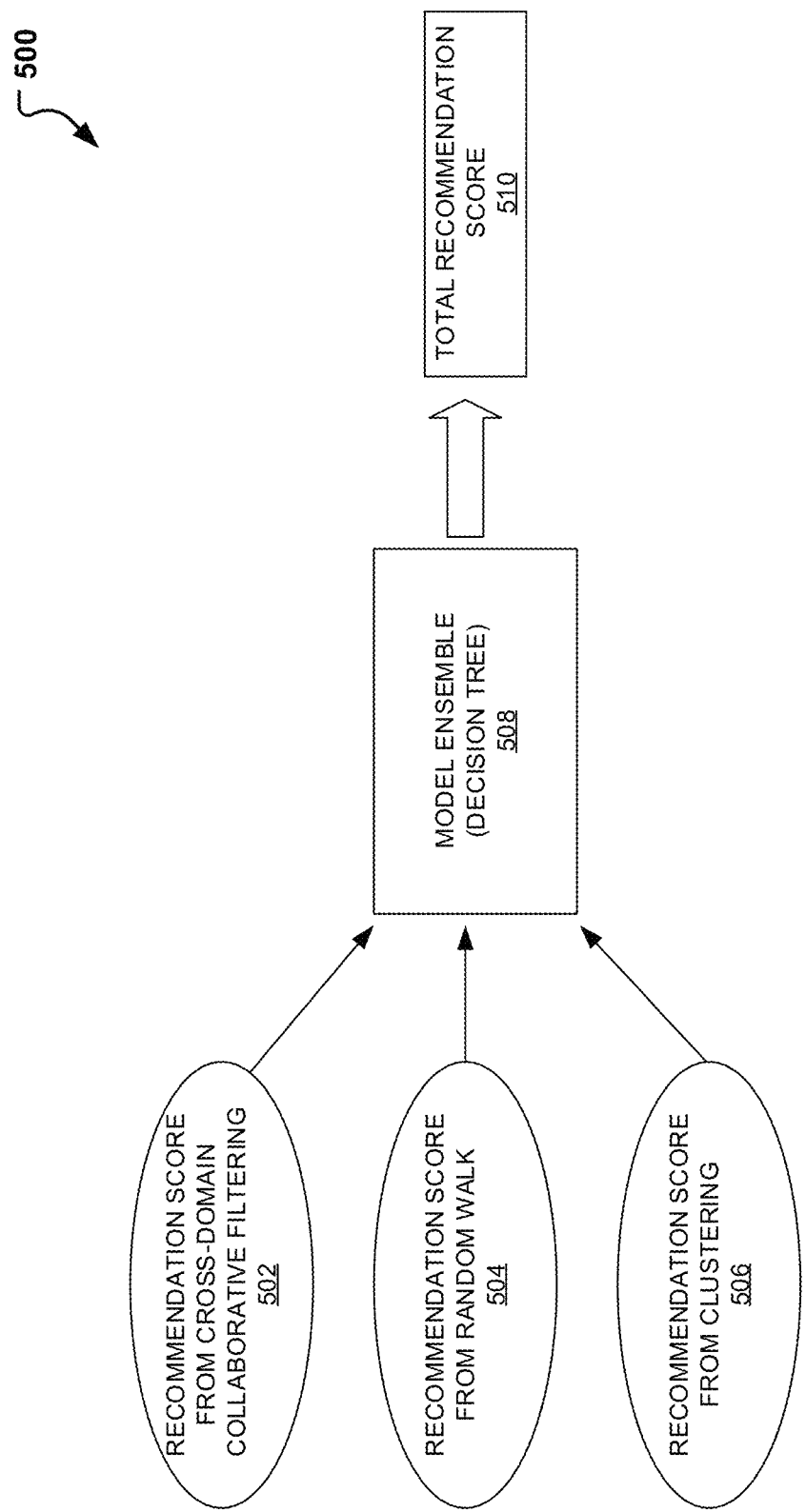
FIG. 5 illustrates a diagram of the implementation of cross-domain collaborative filtering for making recommendations.

Turning to FIG. 5, a more customizable approach for making recommendations is illustrated. In particular, FIG. 5 illustrates a diagram of the implementation of cross-domain collaborative filtering 500 for making recommendations. As illustrated in FIG. 5, the recommendation presented is based on a total recommendation score 510 computed and obtained using an ensemble model 508. An ensemble model 508 is a modeling technique or process which uses two or more analytical models to obtain a final result or recommendation. The final result or recommendation 510 may be obtained by combining a prediction made by each of the models in order to obtain or generate a more accurate final result. Alternatively, the ensemble model 508 may obtain the final result by selecting and using the one or more models which create a best model for the problem considered. For example, in the charity example considered, the ensemble model 508 may obtain a recommendation for one or more best charities by obtaining separate recommendation scores from each of a plurality of models.

In one embedment, in order to obtain a more customized recommendation of a charity, three distinct models 502-506 are presented. In a first model, a recommendation score may be obtained using a model that entails cross-domain collaborative filtering 502. A second model, may include the use of random walk technique for determining a recommendation score 504. While the third model, may include the use of clustering for determining the recommendation score 506.

The first model, which includes the use of cross-collaborative filtering 502 is a model designed to consider not only a user and his/her transactions but consider transactions across domains. For example, transactional information about a merchant and a charity are considered. Thus, one focus of the cross-collaborative filtering model 502 may include making a recommendation based in part on an association or prediction regarding people who made a purchase with a particular merchant and also donated to a particular charity. In other words, the system is designed to show that users who make purchases at a particular merchant are also likely to make a donation to a specific cause. To illustrate this, consider a user who ordered online pet food at merchant X, then given that the user purchased pet food at merchant X, there is a likelihood that the user will donate to the Friends of Animals charity. Thus, a user is presented with a customized charity as opposed to a random or most popular one which may have little or no association with the user and his/her behaviors. Specific details on how the cross-domain model 502 are described below and in conjunction with FIG. 7.

Figure 6:
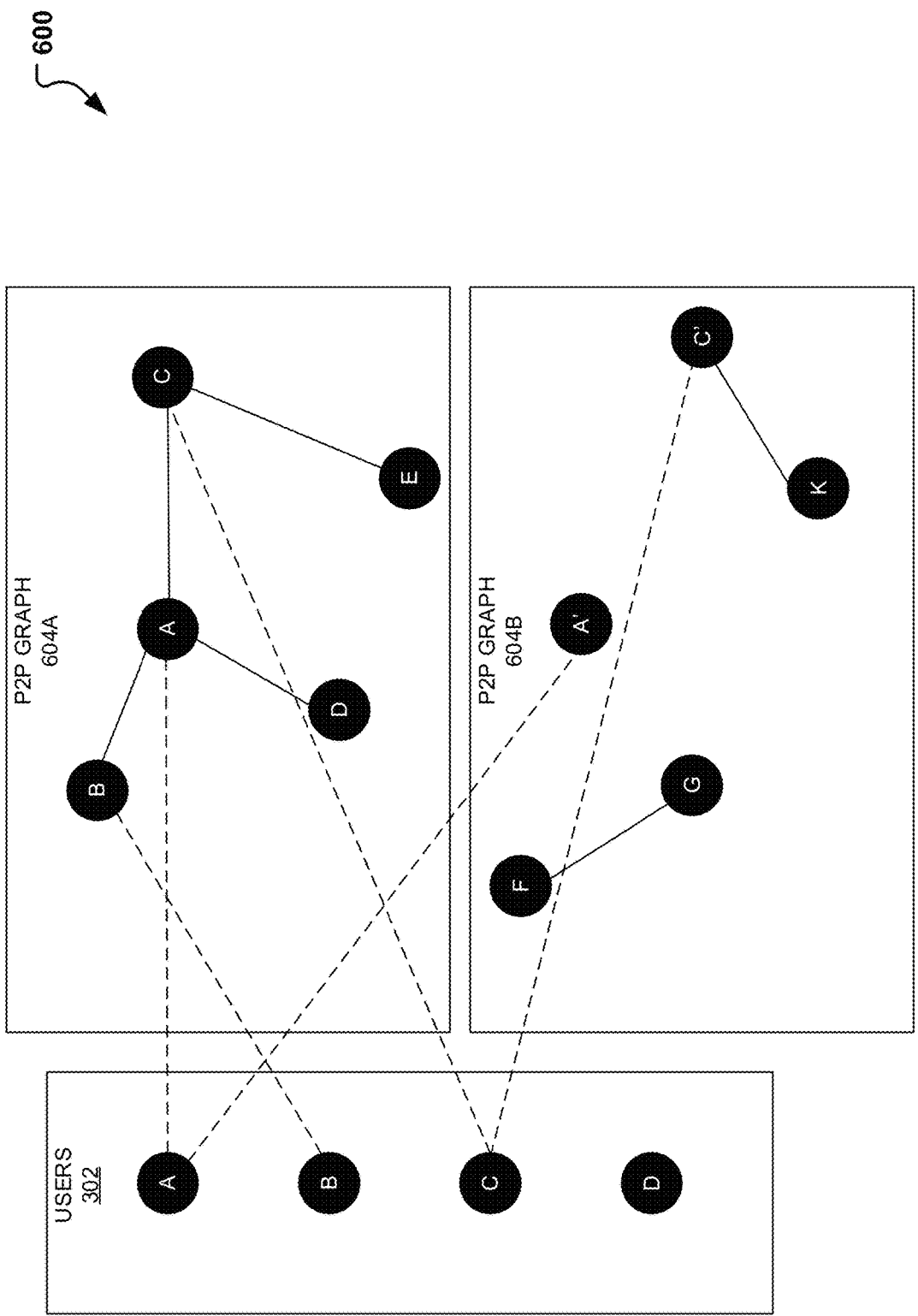
FIG. 6 illustrates a subgraph node representation with users and corresponding peer-to-peer associations used to obtain a recommendation score.

The random walk model 504 is a model that is focused more on transactions and peers associated with a user. For example, consider a user associated with a third-party provider like PayPal. This user may also have separate accounts with Venmo and Xoom (two entities associated with PayPal). Thus, the random walk model 504, may use knowledge of the user's transactions with PayPal as well as those with Venmo and Xoom. Additionally, the random walk model 504, may also use information regarding who the transactions or what peers the user transacted with. Thus, the random walk model can be generated using a mathematical path that can be generated between transactions across entities and/or with other peers. An illustration of such graph is detailed and described in conjunction with FIG. 6 and as described above in use case illustrated by FIG. 3B. Note that although the Venmo and Xoom are use here, other transactions between merchants, using digital instruments, and between peers may be contemplated. FIG. 6 is used for exemplary purposes and is used to illustrate how a recommendation may be presented to a user (or fed into an ensemble model 510 ) based in part on the user's transactions and personal associations including but not limited to contacts, friends, family, organizations, co-workers, etc.

Next, a cluster model 506 may be used for the determination of a recommendation score. The cluster model 506 uses a technique based on grouping objects or dividing a population based on similarities. For example, provided the users are members of a third-party payment provider service (e.g., PayPal) the users may be clustered based on profile data. Thus, in the charity example, a user may be presented with a customized charity or provided a recommendation score based on the cluster the user falls in. The users may therefore be classified into one of n clusters based on a profile data which can include information including but not limited to gender, address, age, marital status, etc. Thus, the focus in using the cluster model 506 may be to present recommendations based on the profile information. For example, all users may be classified into N clusters based on gender and age. In such example, the clustering may result in a number of clusters including but not limited to (male, age<20), (male, 20>age<30), (female, age<20), (female, 20>age<30). Thus, if a user belongs to the cluster (male, 20>age<30), then the most popular charity in the cluster will be recommended to that user.

To determine how to obtain a recommendation or a recommendation score, a score for every charity for each user may be calculated and represented by $$Score = P\left(\frac{\sum \text{transactions to charity } d \text{ in the cluster}}{\sum \text{total charity transactions in the cluster}}\right)$$

the probability of the charity in the user's cluster.

Therefore, turning to FIG. 5, once the models 502-506 have the corresponding recommendation score, the ensemble model 508 may be used to obtain the total recommendation score 510. In one embodiment, the ensemble model 508 can include a decision tree model. A decision tree model is a tree-like graph that is created based on the possible decisions and outcomes possible. As such, using at least some of the recommendation scores, the P2P data, user profile data, and cross-domain information, a decision tree may be created and used to provide a charity recommendation score. As an example, consider Table 1 below, wherein a charity score may be generated based on a merchant's information and P2P transaction information. The ensemble model may be trained for a subset of users and then used for obtaining the recommendations.

| Customer Id | Charity score, S1 (Venmo P2P) | Charity score, S2 (Xoom P2P) | Charity score, S3 (PayPal P2P) | Charity score, S4 (Clustering) | Charity score (Merchant collaborative filtering), S5 | Charity | Tag (1, if customer did a transaction in the charity during target time period) |
|---|---|---|---|---|---|---|---|
| C1 | 0.2 | 0.1 | 0.1 | 0.2 | 0.2 | D1 | 1 |
| C1 | 0.3 | 0.3 | 0.1 | 0.1 | 0.7 | D2 | 0 |
| C1 | 0.3 | 0.5 | 0.5 | 0.3 | 0.3 | D3 | 0 |
| C2 | 0.5 | 0.4 | 0.2 | 0.6 | 0.5 | D1 | 0 |
| C2 | 0.2 | 0.3 | 0.3 | 0.2 | 0.9 | D2 | 1 |

As indicated obtaining a recommendation score is first step in determining what product, service, and in this example, charity to recommend. FIG. 6 illustrates an exemplary subgraph node representation 600 with users 302 and corresponding peer-to-peer associations 604a, b used to obtain a recommendation score. For example, consider a recommendation, where a user's peer-to-peer transactions may be considered to provide a recommendation. In particular, consider an instance where one or more users 302 (using a digital wallet, payment application, merchant site, third party payment provider, or the like) are considered and transactions between the users and across platforms (across other merchant sites, with associating applications like Venmo and/or Xoom, with a bank, etc.) are analyzed for making a recommendation. Using these transactions, it may be determined that there exist correlations between friends and/or family members and likes. For example, using the subgraph node representation 600, it may be determined that a high correlation exists between friends and donations to similar causes.

Turning to FIG. 6 for example, it can be seen that user B (on a payment application, e.g., PayPal) transacted using P2P application (e.g., Venmo) and with user A, C, and D. Similarly, user D has participated in P2P transactions however, mostly across applications as illustrated in P2P graphs 604a, 604b. Thus, subgraph node representation 600 can be created by leveraging the social network data and mapping users and identification information using (fuzzy) logic. Then, using each subgraph generated 302 and 604, algorithms such as random walk and other random processes may be implemented to identify and determine correlations.

In one embodiment, a recommendation or recommendation score may be determined using a random walk 604. To illustrate how a random walk algorithm may be used to construct a recommendation, consider an example where a charity is recommended. To make this recommendation, a series of steps may be followed. As a first step, a transition probability matrix (X) may be constructed. To construct the transition probability matrix X, consider a matrix which is a function of the probability of going from node i (at time t) to node j (at time t+1) is represented by $X_{i,j}=P(S_{t+1}=j|S_t=i)$, where $S_t$ is the current state and the $S_{t+1}$ is the next state in the random walk. Each node is also associated with a self-loop.

Next, the transition probability for n steps are calculated. To calculate the steps, consider $X^n = X \cdot X \cdot X \ldots n$ times, where n is a configurable parameter in the algorithm. Because the example considered here is regarding donations, the probability of making a donation is calculated. In this probability, the donation from a node k to a charity $C_d$ is considered and based on a user's 302 transaction history which can be represented as $$P(C_{k,d}) = \frac{\text{No. of donation transactions by customer } k \text{ to charity } d}{\text{Total No. of donations trnsactions by customer } k}$$

where the probability obtains can then be used to compute a recommendation score for every user/customer (node in the subgraph node representation 600, and for each charity. Therefore, a recommendation score may be computed by $$R\_score_{k,d} = \sum_{p=1}^{m} X_{k,p}^n P(C_{p,d}) \forall k, d$$

where d is a charity, k is a customer or user, and m is the number of nodes in the graph. Thus, using this random walk method 504, a first charity recommendation may be provided to a user based in part on the P2P transactions the user has participated in. Note that a similar approach may be taken for other types of recommendations and a charity recommendation score is computed and used for exemplary purposes. A recommendation may similarly be made for places to eat, items to purchase, discounts to provide, etc. Thus, through the construction of a subgraph with nodes use to indicate transactions or interactions, a probability of an action occurring may be computed and thus a recommendation score may be obtained.

In some embodiments, however, a random walk-based recommendation 504 may not be sufficient to meet a desired criterion or may not provide a desirable recommendation (charity). Thus, as indicated above, a cluster-based recommendation score may be computed and used. Still in other embodiments, an even more personal or tailored recommendation may be desirable. As indicated, in those instances, a cross-domain based recommendation score may be more appropriate.

Figure 7:
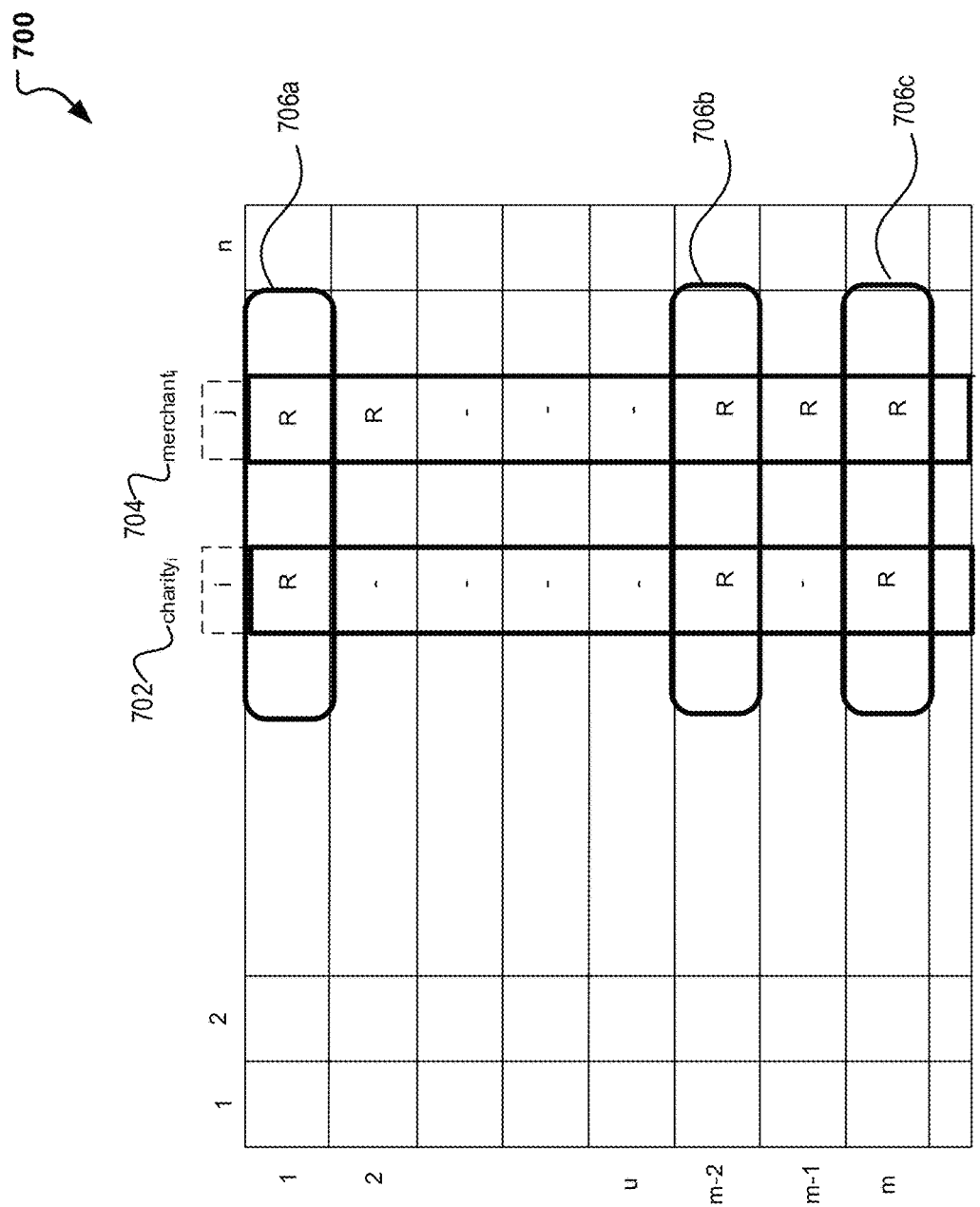
FIG. 7 illustrates table diagram of item-to-item collaborative filtering used to obtain a recommendation score.

To illustrate how a cross-domain based recommendation score may be obtained, FIG. 7 is presented to provide some insight. In particular, FIG. 7 illustrates matrix diagram 700 of item-to-item collaborative filtering used to obtain a recommendation score. In this item-to-item collaborative approach, a cross domain approach is considered where, for example, a merchant and a charity are considered. Therefore, in this ongoing charity example, the recommendation score would be based on a prediction where purchases and contributions are correlated. Thus, prediction may be made that users who purchased with merchant X also donate to charity Y.

Using this approach, a charity-merchant similarity matrix or table diagram 700 is computed illustrating such correlations. Considering matrix diagram 700 or similarity matrix, a first approach is to consider a charity (i) and a merchant (j) and identify those instances where a similarity exists between the two. As illustrated in the similarity matrix, a charity 702 and merchant, 704 are both examined to determine what similarities exist between the two. For example, as illustrated in matrix diagram 700, both charity 702 and merchant 704, share some similarities 706 in rows 1, m−2 and m. From these similarities, a similarity value may be computed and used for determining a recommendation score. In one embodiment, a similarity matrix or matrix diagram 700 may be created based on, for example, co-purchases or other similarity such that $$S_{ij} = J(C_i, M_j) = \frac{|C_i \cap M_j|}{|C_i \cup M_j|}$$

is used as for model training using statistical coefficient measurements such as Jaccard indexing. Alternatively, other measurements and/or indexing mechanisms may be used including but not limited to frequent k characters, hamming distance, correlations, etc. Next, provided the computed index, a prediction may be determined and used in making a recommendation. The prediction may be designed to provide a recommendation to a user. For example, a charity may be determined and recommended to a user. To make the prediction, the weighted sums of the similarity score calculated based on the number of purchases completed by the user with merchants may be used. Therefore, the prediction or recommendation of a given charity maybe provided based on the weighted sum of the similarity score. A charity having the highest score for a user may then be recommended to the user. In one embodiment, the top k charities based on the weighted sum of the similarity score are recommended to the user. Thus, the weighted sum of the similarity score for a user and charity may be calculated based on $$P_{u,i} = \frac{\sum (S_{ij} * R_{ij})}{\sum (R_{ij})}$$

where R denotes the number of transactions of a customer with a merchant or charity and the sum is over the top N user merchants$_j$. Note that the top N user merchants for each user may be selected based on the number of transactions a user may have with each merchant, wherein the execution time of the algorithm may be decrease (significantly) if the computation is restricted to the top N merchants when calculating the weighted score for each charity. Thus, the algorithm is scalable and as such tunable for various values of N.

Recall that once the recommendation score is determined using cross-domain collaborative filtering as discussed and in conjunction with FIG. 7, and/or random walk, and/or clustering, the recommendation score may be further analyzed in order to obtain a total recommendation score. In one embodiment, as described above and in conjunction with FIG. 5, the recommendation scores may be fed into an ensemble model for further processing and total recommendation score 510 determination.

Figure 8:
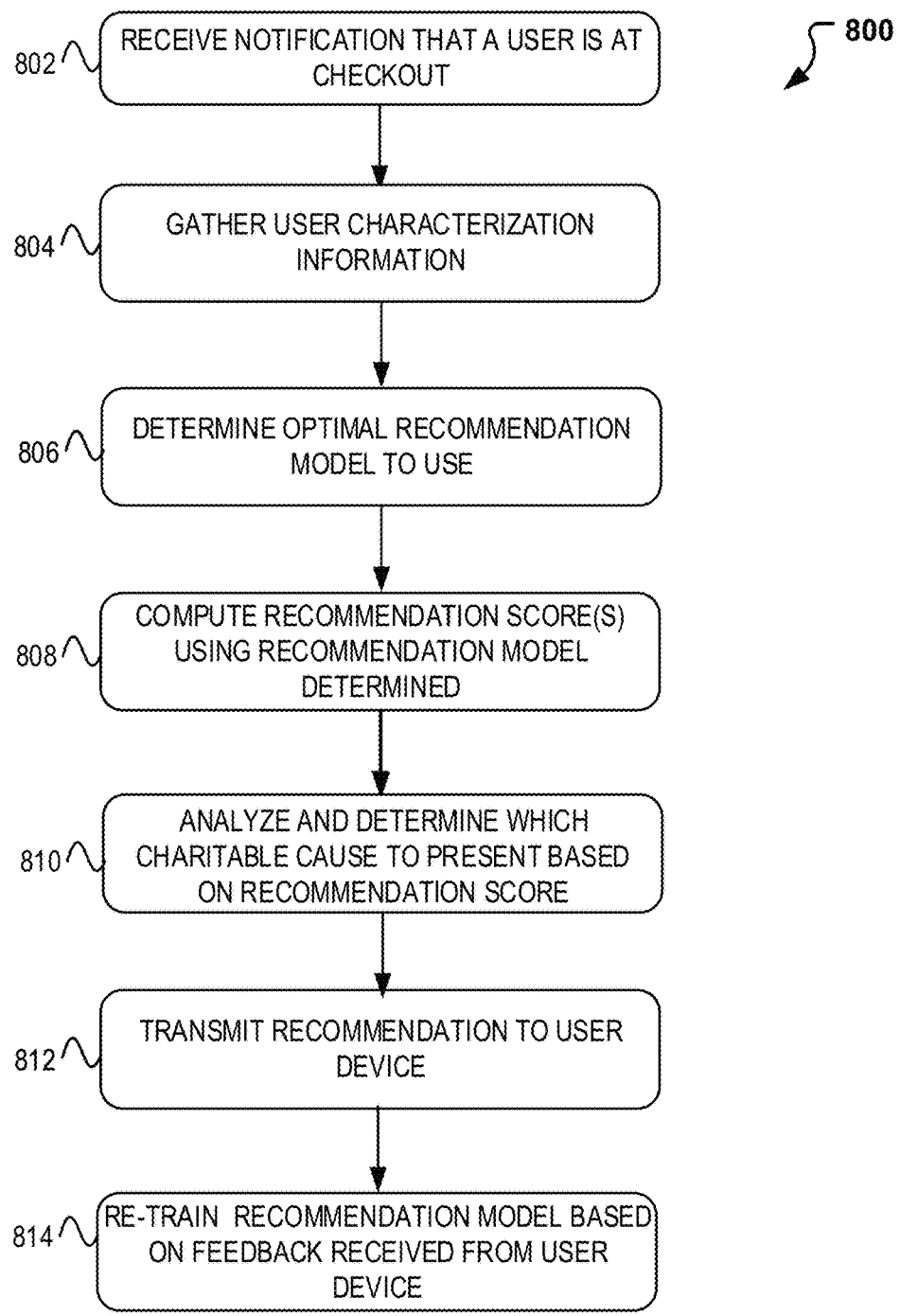
FIG. 8 illustrates a flow diagram illustrating operations for determining recommendations using cross-collaborative filtering.

Turning to FIG. 8, an example process 800 for obtaining a recommendation implemented by a system and method such as that presented above and in conjunction with FIG. 4 is presented. In particular, FIG. 8 illustrates a flow diagram illustrating operations for obtaining a recommendation score using cross-domain collaborative filtering is presented. According to some embodiments, process 800 may include one or more of operations 802-814, which may be implemented, at least in part, in the form of executable code stored on a non-transitory, tangible, machine readable media that, when run on one or more hardware processors, may cause a system to perform one or more of the operations 802-814.

Process 800 may begin with operation 802, where a system receives or determines that user information is available for processing. The determination can be made in part through a notification by the payment provider application on a user device, via a beacon at a merchant location, based on a communication received by a point-of-sale system, from a site accessed on a user device, etc. that a user is at checkout. At checkout, a trigger can be set to communication with a customer engagement platform and/or other data warehouse where user information and characterization information may be gathered. The user information and/or the characterization information can include a user profile, transactional information (including peer-to-peer transactions), charitable contributions, peer associations including but not limited to family, friends, contacts, items purchases and associations with charitable causes, peer donations, and the like.

Once the user information is available for transacting, process 800 can continue to operation 806 where based in part on the characterization or user information retrieved, a determination is made regarding which model(s) to use for obtaining and presenting a recommendation to the user. As indicated above an in conjunction with FIG. 5, a random walk, cluster, and cross-domain collaborative model may be used. Additionally, the model(s) used may be further used in conjunction with an ensemble model for determining recommendation score(s) for charitable causes that may be presented to a user for donation at operation 808. Recall that in the cross-domain filtering model, a recommendation may be made based in part on an association or prediction regarding people who made a purchase with a particular merchant and also donated to a particular charity. In other words, the system is designed to show that users who make purchases at a particular merchant are also likely to make a donation to a specific cause. The random walk model may include a model that is focused more on transactions and peers associated with a user and may also use information regarding who the transactions or what peers the user transacted with. Thus, the random walk model can be generated using a mathematical path that can be generated between transactions across entities and/or with other peers to determine a recommendation score. The clustering model may be a model that uses a technique based on grouping objects or dividing a population based on similarities. For example, provided the users are members of a third-party payment provider service (e.g., PayPal) the users may be clustered based on profile data. Thus, in the charity example, a user may be presented with a customized charity or provided a recommendation score based on the cluster the user falls in. The users may therefore be classified into one of n clusters based on a profile data which can include information including but not limited to gender, address, age, marital status, etc. As such, the clustering model may be a model that users a user profile information to provide a recommendation score.

The ensemble model may be used when it is determined that an input to the ensemble model is necessitated to obtain a recommendation score from a combination of one or more of the models. For example, in one embodiment, the ensemble model may be used to obtain the recommendation score from the model using cross-domain filtering. In another embodiment, it may determine that an input to the ensemble model may necessitate the recommendation score from the model using random walk and/or a combination of the cross-domain filtering model. Still in another embodiment, it may determine that the input to the ensemble model may necessitate the recommendation score from the model using the cross-domain filtering model, and the random walk model, and/or the clustering model.

Next, at operation 810, a determination is made as to the one or more causes with the higher recommendation scores that may be used here and presented to the user at operation 812. Presentation of the one or more cause to present to a user may occur on the user device over a wireless or other communication network, via a user interface of an application associated with a merchant and/or payment provider when the user is at checkout.

Once the recommendations scores are determined, charitable causes selected, and recommendations transmitted to the user device, process 800 continues to operation 814 where as a result of the action taken by the user in response to the recommendation the recommendation model(s) is updated. That is to say, upon transmitting the recommendation to the user, the user may either donate or not to the cause presented. The donation or lack thereof is recorded and feedback to the training model of that future charitable cause recommendations may be presented accordingly and based on the user's past donation behavior. Thus, the recommendation model is re-trained the based on a feedback received, over a communication network, from the user device in response to the recommendation transmitted Note that although process 800 is described to include the computation a recommendation scores, with the aid of user information, other information and models may be used. Additionally, the order of the models used, analysis of the recommendation scores, and presentation of charitable causes may occur in a varying order and process 800 is presented herein for exemplary purposes. Further, the recommendation may be presented to a user on a mobile device, smart phone, laptop, desktop, or other device available to present the recommendation. Details on such device are described below and in conjunction with FIG. 10.

Figure 9:
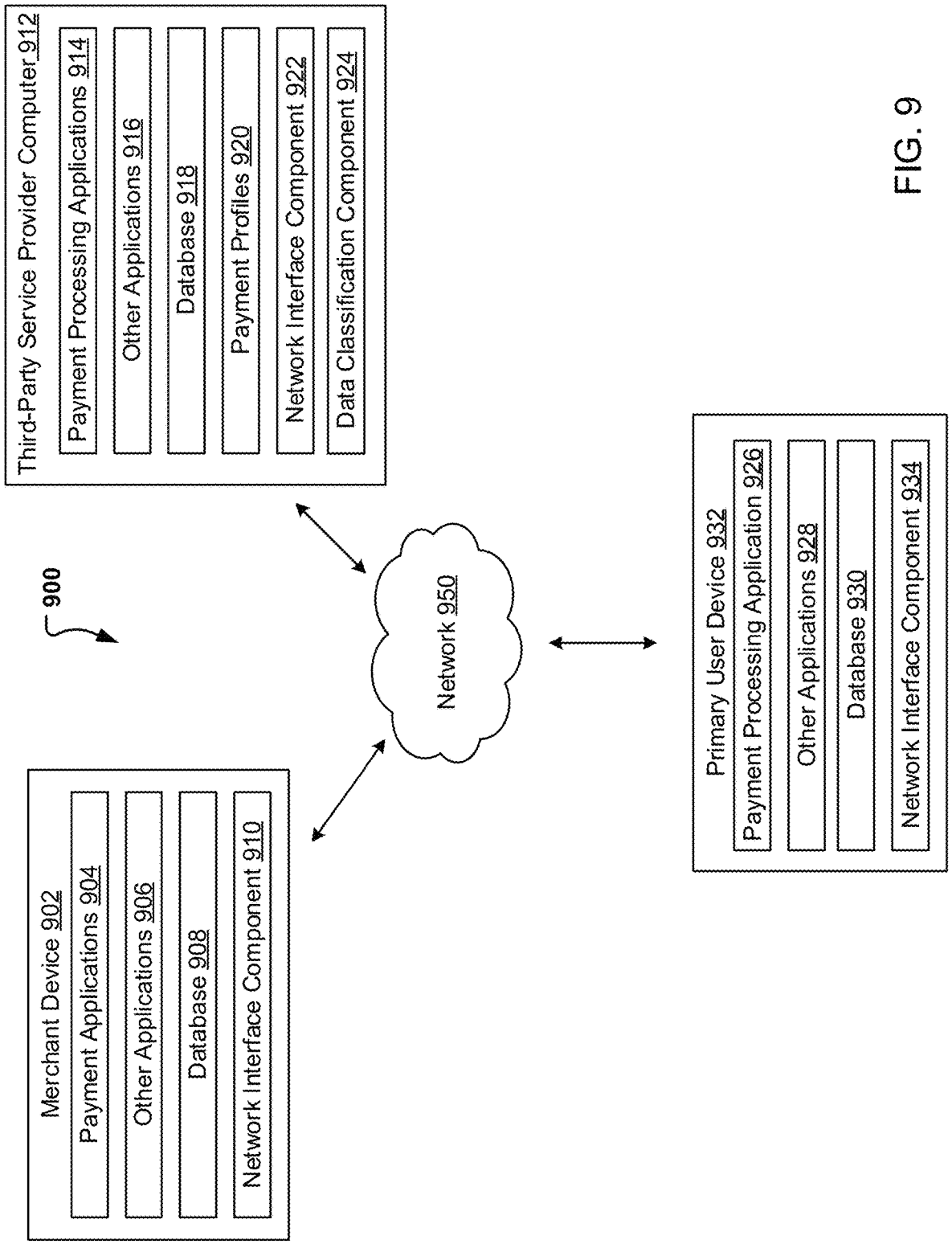
FIG. 9 illustrates a block diagram of a system for determining recommendations using cross-domain filtering.

FIG. 9 is a block diagram of a networked system 900 for implementing the processes described herein, according to an embodiment. In particular, FIG. 9 illustrates a block diagram of a system 900 for proving recommendations using cross domain filtering. As shown, system 900 may include or implement a plurality of devices, computers, servers, and/or software components that operate to perform various methodologies in accordance with the described embodiments. It will be appreciated that the devices, computers, and/or servers illustrated in FIG. 9 may be deployed differently and that the operations performed, and/or the services provided by such devices, computers, and/or servers may be combined or separated for a given embodiment and may be performed by a greater number or fewer number of devices, computers, and/or servers. Furthermore, one or more of the devices, computers, and/or servers may be operated and/or maintained by the same or different entities.

System 900 includes a merchant/charity device 902, a primary user device 932, a third-party service provider computer 912 in communication over a network 950. These devices 902, 932, and 912 are exemplary devices that may interact during a transaction that may result in a charitable contribution.

The merchant device 902, primary user device 932, and the third-party service provider computer 912 may each include one or more processors, memories, and other appropriate components for executing computer-executable instructions such as program code and/or data. The computer-executable instructions may be stored on one or more computer readable mediums or computer readable devices to implement the various applications, data, and steps described herein. For example, such instructions may be stored in one or more computer readable media such as memories or data storage devices internal and/or external to various components of system 900, and/or accessible over network 950.

The merchant device 902 may be implemented as a communication device that may utilize appropriate hardware and software configured for wired and/or wireless communication with the primary user device 932 and third-party service provider computer 912. For example, the merchant device 902 may be implemented as a personal computer (PC), a smart phone, laptop/tablet computer, point-of-sale device, wristwatch with appropriate computer hardware resources, eyeglasses with appropriate computer hardware, other type of wearable computing device, implantable communication devices, servers, and/or other types of computing devices capable of transmitting and/or receiving data. The merchant device 902 may correspond to and be utilized by a user, such as an employee of a merchant and/or another person authorized by the merchant, or independently as a stand-alone system.

The merchant device 902 may include one or more payment applications 904, other applications 906, a database 908, and a network interface component 910. The payment applications 904 and other applications 906 may correspond to executable processes, procedures, and/or applications with associated hardware. In other embodiments, merchant device 902 may include additional or different components having specialized hardware and/or software to perform operations associated with the payment applications 904 and/or the other applications 906.

The payment application 904 may facilitate financial transactions corresponding to the sale of goods and/or services offered by the merchant. For example, the payment application 904 may provide an interface for customers to purchase the goods or services, make a contribution, and to receive customer payment information (e.g., customer credit card information). The payment application 904 may further transmit customer payment information to a payment processor (e.g., such as a payment processor corresponding to the third-party service provider computer 912) to process the customer payment information. The payment application 904 may also facilitate other types of financial transactions such as banking, online payments, money transfer, donations, and/or the like.

The merchant device 902 may execute the other applications 906 to perform various other tasks and/or operations corresponding to the merchant device 902. For example, the other applications 906 may include security applications for implementing client-side security features, programmatic client applications for interfacing with appropriate application programming interfaces (APIs) over network 950, or other types of applications. In various embodiments, the other applications 906 may include social networking applications. Additionally, the other applications 906 may include device interfaces and other display modules that may receive input and/or output information. For example, the other applications 906 may include a graphical user interface (GUI) configured to provide an interface to the user. As an example, the graphical user interface may include a selectable button designed to provide a donation to a charitable cause and/or other applications 906 may be associated with a charitable cause designed for making contributions or donations.

The merchant device 902 may further include a database 908, which may be stored in a memory and/or other storage device of the merchant device 602. The database 908 may include, for example, identifiers (IDs) such as operating system registry entries, cookies associated with the payment application 904 and/or other applications 906, IDs associated with hardware of the network interface component 910, IDs used for payment/user/device authentication or identification, and/or other appropriate IDs. The database 908 may also include information corresponding to one or purchase transactions of customers who have purchased goods or services from the merchant, browsing histories of the customers, or other types of customer information. In certain embodiments, the merchant device 902 may also include information corresponding to payment tokens, such as payment tokens generated by the third-party service provider computer 912.

The merchant device 902 may also include at least one network interface component 910 configured to communicate with various other devices such as the primary user device from user 302h, and/or the third-party service provider computer 912. In various embodiments, network interface component 910 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth®, Bluetooth low-energy, near field communication (NFC) devices, and/or the like. Additionally, or alternatively, the merchant device 902 may include a charitable device designed to receive and transact with a user in making a donation.

The third-party service provider computer 912 may be maintained, for example, by a third-party service provider, which may provide payment processing services for the merchant. In one example, the third-party service provider may be provided by PAYPAL™ Inc. of San Jose, Calif., USA. Alternatively, the third-party service provider computer 912 may be associated with a user 302 of the primary device. As such, the third-party service provider computer 912 includes one or more payment processing applications 914, which may be configured to process payment information received from the merchant device 902 or from a selection at the primary user device 932. For example, the payment application 904 of the merchant device 902 may receive payment information from a customer to purchase a service or good offered by the merchant. Upon receipt of the payment information, the payment application 904 may transmit the payment information to the third-party service provider computer 912. The payment processing application 914 of the third-party service provider computer 912 may receive and process the payment information. As another example, the payment application 904 can present a payment code on a display of the user device associated with the merchant. The payment code can be scanned or transmitted to the merchant device 902 for payment processing. Still as another example, the payment processing application can present a successful transaction notification on the display of the user device when the application has been authorized and ready for post-processing.

The third-party service provider computer 912 may execute the other applications 916 to perform various other tasks and/or operations corresponding to the third-party service provider computer 912. For example, the other applications 916 may include security applications for implementing client-side security features, programmatic client applications for interfacing with appropriate APIs over the network 950, or and applications associated with making a charitable cause recommendation other types of applications. The other applications 916 may also include additional communication applications, such as email, texting, voice, and IM applications that enable communication of emails, calls, texts, and other notifications through the network 950. In various embodiments, the other applications 916 may include location detection applications, such as a mapping, compass, and/or GPS applications, which may be used to determine a location of the third-party service provider computer 912. Additionally, the other applications 916 may include device interfaces and other display modules that may receive input and/or output information. For example, the other applications 916 may include a GUI configured to provide an interface to one or more users.

The third-party service provider computer 912 may further include a database 918, which may be stored in a memory and/or other storage device of the third-party service provider computer 912. The database 918 may include, for example, IDs such as operating system registry entries, cookies associated with the payment processing application 914 and/or other the applications 916, IDs associated with hardware of the network interface component 922, IDs used for payment/user/device authentication or identification, transaction IDs, and/or other appropriate IDs.

According to a particular embodiment, the third-party service provider computer 912 may include a set of payment profiles 920 corresponding to past sales transactions executed by the merchant device with respect to one or more customers of the merchant. Alternatively, the third-party service provider computer 912 may include a set of merchant payment profiles corresponding to the payment sources associated to a corresponding merchant. For example, a particular payment profile from the set of payment profiles 920 may include payment information corresponding to a particular customer of the merchant and/or a merchant associated with a user. The payment information may include credit card information (e.g., encrypted card number, expiration date, security code, card issuer, and/or the like), Automated Clearing House (ACH) information (e.g., encrypted account number, routing number, and/or the like), identification information associated with the particular customer/user (e.g., a customer identifier, name, address, phone number, date of birth, and/or the like), billing information, credit score, and/or any other type of payment information associated with the particular customer. Furthermore, other payment profiles of the set of payment profiles 920 may include payment information corresponding to other customers of the merchant and/or other merchants associated with the user. In addition, the third-party service provider computer 912 may store the set of payment profiles 920 according to a first file format.

Similarly, in another embodiment, the third-party service provider computer 912 may include a set of donations, contact profiles, user profile information, etc. which may be used in providing recommendations. The recommendations may be presented to a user of the primary user device 932 and identified in-part based on the profile information collected and stored.

The third-party service provider computer 912 may also store a set of payment tokens corresponding to the set of payment profiles 920. For example, each payment profile of the set of payment profiles 920 may be associated with a corresponding payment token from the set of payment tokens. In some embodiments, each payment profile may include a corresponding payment token from the set of payment tokens. The set of payment tokens may be particular to the third-party service provider computer 912 (e.g., computers from other service providers may be unable to use the set of payment tokens) and may enable the merchant device 902 to more securely process payment transactions with the third-party service provider computer 912. For example, in order to process a payment transaction that involves a credit card number associated with a particular payment profile, the third-party service provider computer 912 may provide the merchant device 902 with a particular payment token that is different from the credit card number. The merchant device 902 may use the particular payment token to process the payment transaction instead of the credit card number. Further, the merchant device may store and associate the particular payment token with the particular payment profile instead of the credit card number, thereby protecting the credit card number from being stolen in a potential security breach of the merchant device 902.

In various embodiments, the third-party service provider computer 912 also includes at least one network interface component 922 that is configured to communicate with the merchant device 902 and/or the primary user device 932 via the network 950.

The third-party provider computer 912, may also include a data classification component 924 that may be used for raw data classification. In one embodiment, the raw data received by the third-party service provider computer 912 and/or stored in database 918 can be analyzed to identify errors in transaction post-processing, determine cross-domain correlations, determine user specific recommendations, determine a recommendation score, etc.

The primary user device 932 may be implemented as a communication device that may utilize appropriate hardware and software configured for wired and/or wireless communication with the merchant device 902 and third-party service provider computer 912. The primary user device 932, may be a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data. In one embodiment, the primary user device 932 may be mobile device communicating with wearable device (or secondary user device), merchant device 902, or directly with the third-party service provider system 912.

The primary user device 932 may include a payment processing application 926 that may be used as a digital wallet that can communicate with a merchant device 902, a secondary user device, and/or third-party service provider 912 for purchasing and transacting. The payment processing application 926, can work jointly with database 930 for retrieving bank account information, user accounts, security codes, tokens that may be associated with various merchant locations, charities, and other relevant causes. Similarly, the payment processing application, can also provide access the user profiles for determining which payment method, processing code, and/or recommendation to make and use.

The primary user device 932 may also include other applications 928 to perform various other tasks and/or operations corresponding to the primary user device 932. For example, the other applications 928 may facilitate communication with the merchant device 902, such as to receive an indication, from the merchant device 902, to switch payment processing services from the third-party service provider to the service provider. As another example, the other applications 928 may include security applications, application that enable designation of a primary interactive device, and applications that allow for web site searches (including access to merchant websites). The other applications 928 may also include additional communication applications, such as email, texting, voice, and IM applications that enable communication of emails, calls, texts, and other notifications through the network 950. In various embodiments, the other applications 928 may include location detection applications, such as a mapping, compass, and/or GPS applications, which may be used to determine a location of the primary user device 932. The other applications 928 may include social networking applications. Additionally, the other applications 928 may include device interfaces and other display modules that may receive input and/or output information. For example, the other applications 928 may include a GUI configured to provide an interface to one or more users.

The primary user device 932 may further include a database 930, which may be stored in a memory and/or other storage device of the primary user device 932. The database 930 may include, for example, identifiers (IDs) such as operating system registry entries, cookies associated with a web browser and/or the other applications 928, IDs associated with hardware of the network interface component 934, IDs used for payment/user/device authentication or identification, bank information, merchant information, user accounts, and/or other appropriate IDs.

The primary user device 932 may also include at least one network interface component 934 configured to communicate with various other devices such as the merchant device 902 and/or the third-party service provider computer 912.

Figure 10:
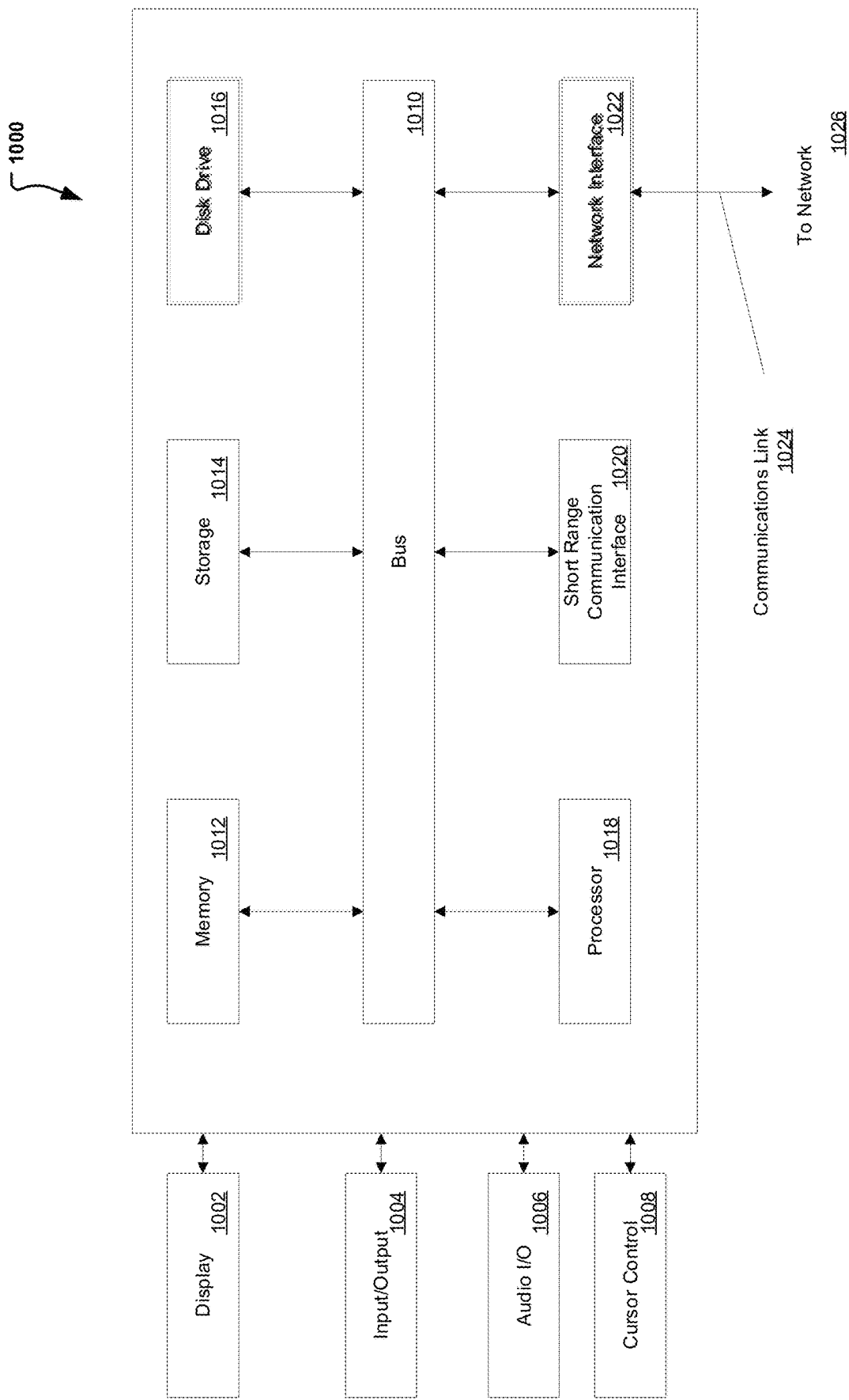
FIG. 10 illustrates an example block diagram of a computer system suitable for implementing one or more devices of the communication systems of FIGS. 1-9.

FIG. 10 illustrates an example computer system 1000 in block diagram format suitable for implementing on one or more devices of the system in FIG. 4. In various implementations, a device that includes computer system 1000 may comprise a computing device (e.g., a smart or mobile device, a computing tablet, a personal computer, laptop, wearable device, PDA, server, etc.) that is capable of communicating with a network 1026. A service provider and/or a content provider may utilize a network computing device (e.g., a network server or third-party service provider computer 912) capable of communicating with the network 1026. It should be appreciated that each of the devices utilized by users, service providers, and content providers may be implemented as computer system 1000 in a manner as follows.

Additionally, as more and more devices become communication capable, such as new smart devices using wireless communication to report, track, message, relay information and so forth, these devices may be part of computer system 1000. For example, windows, walls, and other objects may double as touch screen devices for users to interact with. Such devices may be incorporated with the systems discussed herein.

Computer system 1000 may include a bus 1010 or other communication mechanisms for communicating information data, signals, and information between various components of computer system 1000. Components include an input/output (I/O) component 1004 that processes a user action, such as selecting keys from a keypad/keyboard, selecting one or more buttons, links, actuatable elements, etc., and sending a corresponding signal to bus 1010. I/O component 1004 may also include an output component, such as a display 1002 and a cursor control 1008 (such as a keyboard, keypad, mouse, touchscreen, etc.). In some examples, I/O component 1004 may include an image sensor for capturing images and/or video, such as a complementary metal oxide semiconductor (CMOS) image sensor, and/or the like. An audio input/output component 1006 may also be included to allow a user to use voice for inputting information by converting audio signals. Audio I/O component 1006 may allow the user to hear audio. A transceiver or network interface 1022 transmits and receives signals between computer system 1000 and other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 1018, which may be a microcontroller, digital signal processor (DSP), or other processing component, that processes these various signals, such as for display on computer system 1000 or transmission to other devices over a network 1026 via a communication link 1024. Again, communication link 1024 may be a wireless communication in some embodiments. Processor 1018 may also control transmission of information, such as cookies, IP addresses, images, and/or the like to other devices.

Components of computer system 1000 also include a system memory component 1012 (e.g., RAM), a static storage component 1014 (e.g., ROM), and/or a disk drive 1016. Computer system 1000 performs specific operations by processor 1018 and other components by executing one or more sequences of instructions contained in system memory component 1012. Logic may be encoded in a computer readable medium, which may refer to any medium that participates in providing instructions to processor 1018 for execution. Such a medium may take many forms, including but not limited to, non-volatile media, volatile media, and/or transmission media. In various implementations, non-volatile media includes optical or magnetic disks, volatile media includes dynamic memory such as system memory component 1012, and transmission media includes coaxial cables, copper wire, and fiber optics, including wires that comprise bus 1010. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, hard disk, magnetic tape, any other magnetic medium, CD-ROM, any other optical medium, RAM, PROM, EPROM, FLASH-EPROM, any other memory chip or cartridge, or any other medium from which a computer is adapted to read.

Components of computer system 1000 may also include a short-range communications interface 1020. Short range communications interface 1020, in various embodiments, may include transceiver circuitry, an antenna, and/or waveguide. Short range communications interface 1020 may use one or more short-range wireless communication technologies, protocols, and/or standards (e.g., WIFI, Bluetooth®, Bluetooth Low Energy (BLE), infrared, NFC, etc.).

Short range communications interface 1020, in various embodiments, may be configured to detect other devices (e.g., primary user device 1032, merchant device 1002, etc.) with short range communications technology near computer system 1000. Short range communications interface 1020 may create a communication area for detecting other devices with short range communication capabilities. When other devices with short range communications capabilities are placed in the communication area of short range communications interface 1020, short range communications interface 1020 may detect the other devices and exchange data with the other devices. Short range communications interface 1020 may receive identifier data packets from the other devices when in sufficiently close proximity. The identifier data packets may include one or more identifiers, which may be operating system registry entries, cookies associated with an application, identifiers associated with hardware of the other device, and/or various other appropriate identifiers.

In some embodiments, short range communications interface 1020 may identify a local area network using a short-range communications protocol, such as Wi-Fi, and join the local area network. In some examples, computer system 1000 may discover and/or communicate with other devices that are a part of the local area network using short range communications interface 1020. In some embodiments, short range communications interface 1020 may further exchange data and information with the other devices that are communicatively coupled with short range communications interface 1020.

In various embodiments of the present disclosure, execution of instruction sequences to practice the present disclosure may be performed by computer system 1000. In various other embodiments of the present disclosure, a plurality of computer systems 1000 coupled by communication link 1024 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link 1024 and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants/vendors and customers; however, a customer or consumer can pay, or otherwise interact with any type of recipient, including charities and individuals. Thus, "merchant" as used herein can also include charities, individuals, and any other entity or person receiving a payment from a customer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
   a non-transitory memory storing instructions;
   a processor configured to execute the instructions to cause the system to:
      in response to a notification received that a user is at a checkout, retrieve, from a customer engagement platform, user characterization information;
      select one or more recommendation models to use for determining a recommendation to present to the user, based on the user characterization information,
         the selected one or more recommendation models including one or both of a random walk model or a clustering model; and
         the clustering model selected when the user characterization information includes user profile information;
      compute, using the selected one or more recommendation models, at least one recommendation score;
      analyze the at least one recommendation score to determine the recommendation to present to the user;
      transmit, over a communication network and to a computing device associated with the user, the determined recommendation that causes the determined recommendation to be displayed on the computing device to the user;
      receive, via the computing device and in response to the determined recommendation displayed to the user, feedback from the user; and
      re-train the selected one or more recommendation models based on the received feedback in a recommendation model-training feedback loop including the selected one or more recommendation models and the received feedback.

2. The system of claim 1, wherein:
   the one or more recommendation models include a plurality of recommendation models; and
   the at least one recommendation score is computed using the plurality of recommendation models and an ensemble model.

3. The system of claim 2, wherein the ensemble model includes a decision tree model.

4. The system of claim 2, wherein the ensemble model uses a plurality of recommendation scores generated by the plurality of recommendation models to compute the at least one recommendation score.

5. The system of claim 1, wherein the random walk model is selected when the user characterization information includes a combination of user profile information and peer-to-peer transactions information.

6. The system of claim 1, wherein the selected one or more recommendation models comprises at least two recommendation models that further include a cross-domain filtering model.

7. The system of claim 1, wherein the cross-domain filtering model is selected when the user characterization information includes a combination of user profile information, peer-to-peer transactions information, and cross-domain transactional information.

8. A method performed by one or more processors, comprising:
   in response to a notification received that a user is at a checkout, retrieving, from a customer engagement platform, user characterization information;
   selecting one or more recommendation models to use for determining a recommendation to present to the user, based on the user characterization information,
      the selected one or more recommendation models including one or both of a random walk model or a clustering model;
      the random walk model is selected when the user characterization information includes a combination of user profile information and peer-to-peer transactions information; and
      the clustering model selected when the user characterization information includes user profile information;
   computing, using the selected one or more recommendation models, at least one recommendation score;
   analyzing the at least one recommendation score to determine the recommendation to present to the user;
   transmitting, over a communication network and to a computing device associated with the user, the determined recommendation that causes the determined recommendation to be presented the user through a display of the computing device;
   receiving, via the computing device and in response to the determined recommendation presented to the user, feedback from the user; and
   re-training the selected one or more recommendation models based on the received feedback in a recommendation model-training feedback loop including the selected one or more recommendation models and the received feedback.

9. The method of claim 8, wherein:
the one or more recommendation models include a plurality of recommendation models; and
the at least one recommendation score is computed using the plurality of recommendation models and an ensemble model.

10. The method of claim 9, wherein the ensemble model includes a decision tree model.

11. The method of claim 9, wherein the ensemble model uses a plurality of recommendation scores generated by the plurality of recommendation models to compute the at least one recommendation score.

12. The method of claim 8, wherein the selected one or more recommendation models comprises at least two recommendation models that further include a cross-domain filtering model.

13. The method of claim 8, wherein the cross-domain filtering model is selected when the user characterization information includes a combination of user profile information, peer-to-peer transactions information, and cross-domain transactional information.

14. A non-transitory machine-readable medium having instructions stored thereon, the instructions executable to cause performance of operations comprising:
in response to a notification received that a user is at a checkout, retrieving, from a customer engagement platform, user characterization information;
selecting one or more recommendation models to use for determining a recommendation to present to the user, based on the user characterization information,
the selected one or more recommendation models including one or both of a random walk model or a clustering model; and
the clustering model selected when the user characterization information includes user profile information;
computing, using the selected one or more recommendation models, at least one recommendation score;
analyzing the at least one recommendation score to determine the recommendation to present to the user;
transmitting, over a communication network and to a computing device associated with the user, the determined recommendation to cause the determined recommendation to be presented to the user via the computing device;
receiving, via the computing device and in response to the determined recommendation presented to the user, feedback from the user; and
re-training the selected one or more recommendation models based on the received feedback in a recommendation model-training feedback loop including the selected one or more recommendation models and the received feedback.

15. The non-transitory machine-readable medium of claim 14, wherein the one or more recommendation models include a plurality of recommendation models; and
the at least one recommendation score is computed using the plurality of recommendation models and an ensemble model.

16. The non-transitory machine-readable medium of claim 15, wherein the ensemble model includes a decision tree model and uses a plurality of recommendation scores generated by the plurality of recommendation models to compute the at least one recommendation score.

17. The non-transitory machine-readable medium of claim 14, wherein the random walk model is selected when the user characterization information includes a combination of user profile information and peer-to-peer transactions information.

18. The non-transitory machine-readable medium of claim 14, wherein the selected one or more recommendation models comprises at least two recommendation models that further include a cross-domain filtering model.

19. The non-transitory machine-readable medium of claim 14, wherein the cross-domain filtering model is selected when the user characterization information includes a combination of user profile information, peer-to-peer transactions information, and cross-domain transactional information.

\* \* \* \* \*